US012739761B2

(12) United States Patent
Liu et al.

(10) Patent No.: US 12,739,761 B2
(45) Date of Patent: Sep. 15, 2026

(54) SYNCHRONIZATION SIGNAL BLOCK CONFIGURATION FOR BANDWIDTH NARROWER THAN A MINIMUM BANDWIDTH

(71) Applicant: QUALCOMM Incorporated, San Diego, CA (US)

(72) Inventors: Le Liu, San Jose, CA (US); Alberto Rico Alvarino, San Diego, CA (US); Wanshi Chen, San Diego, CA (US); Lorenzo Casaccia, Barcelona (ES); Farrokh Khatibi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 256 days.

(21) Appl. No.: 18/253,680

(22) PCT Filed: Jan. 21, 2022

(86) PCT No.: PCT/US2022/070285
§ 371 (c)(1),
(2) Date: May 19, 2023

(87) PCT Pub. No.: WO2022/165468
PCT Pub. Date: Aug. 4, 2022

(65) Prior Publication Data

US 2024/0015678 A1 Jan. 11, 2024

(30) Foreign Application Priority Data

Jan. 29, 2021 (EP) .................................... 21382072

(51) Int. Cl.
*H04W 56/00* (2009.01)
*H04L 1/00* (2006.01)

(52) U.S. Cl.
CPC ....... *H04W 56/0015* (2013.01); *H04L 1/0068* (2013.01)

(58) Field of Classification Search
CPC ........... H04W 56/0015; H04W 56/001; H04W 56/002; H04L 5/005; H04L 5/0053; H04L 5/0051; H04L 1/0068
See application file for complete search history.

(56) References Cited

U.S. PATENT DOCUMENTS 10,707,979 B2 * 7/2020 Ananda .............. H04W 52/325
2019/0335426 A1 * 10/2019 Kim ..................... H04W 72/23
(Continued)

FOREIGN PATENT DOCUMENTS

WO 2019160752 A1 8/2019
WO WO 2019/160752 * 7/2020 .......... H04W 52/325
(Continued)

OTHER PUBLICATIONS

Ericsson: "Summary of Email Discussion on NR-Light", 3GPP TSG RAN Meeting #85, RP-192160, Summary of email Discussion on NR-Light, 3rd Generation Partnership Project, Mobile Competence Centre, 650, Route Des Lucioles, F-06921 Sophia-Antipolis Cedex, France, vol. TSG RAN, No. Newport Beach, US, Sep. 16, 2019-Sep. 19, 2019, Sep. 9, 2019, XP051782678, pp. 1-56, p. 16 p. 41, p. 33, p. 42, p. 46, p. 30, last paragraph, point 1, p. 41, first paragraph.
(Continued)

*Primary Examiner* — Phong La
(74) *Attorney, Agent, or Firm* — Harrity & Harrity, LLP

(57) ABSTRACT

Various aspects of the present disclosure generally relate to wireless communication. In some aspects, a user equipment (UE) may receive, from a base station, a synchronization signal block (SSB) associated with an SSB configuration for an operating band having a maximum bandwidth that is
(Continued)

narrower than a minimum SSB bandwidth for an access link. The UE may decode the SSB based at least in part on the SSB configuration. Numerous other aspects are described.

30 Claims, 14 Drawing Sheets

(56) References Cited

U.S. PATENT DOCUMENTS

2020/0053670 A1* 2/2020 Jung ................. H04W 56/0015
2020/0112978 A1* 4/2020 Zhang ................... H04W 72/21
2020/0337002 A1* 10/2020 Ko ........................ H04L 5/0016
2020/0404600 A1* 12/2020 Ly ......................... H04L 5/0051
2021/0234663 A1* 7/2021 Kim ...................... H04L 5/0048
2022/0294497 A1* 9/2022 Choi ........................ H04J 11/00
2023/0319747 A1* 10/2023 Goyal ................... H04W 68/02
370/503
2023/0370918 A1* 11/2023 Maleki .................. H04W 48/20
2024/0015678 A1* 1/2024 Liu ................... H04W 56/0015
2024/0373422 A1* 11/2024 Alfarhan ........... H04W 72/1268

FOREIGN PATENT DOCUMENTS

WO WO-2020186946 A1 * 9/2020 ............ H04W 72/30
WO WO-2020194240 A1 * 10/2020 ........... H04L 5/0053
WO WO-2020209657 A1 * 10/2020 ............ H04W 72/20
WO 2021010786 A1 1/2021
WO WO-2021062689 A1 * 4/2021 ........ H04W 72/0453

OTHER PUBLICATIONS

European Search Report—EP21382072—Search Authority—The Hague—Dec. 20, 2021.
International Search Report and Written Opinion—PCT/US2022/070285—ISA/EPO—Apr. 20, 2022.

* cited by examiner

600

600

640
First SSB transmission including PBCH RBs in upper region within operating band maximum bandwidth

| RB index | symbol 0 | symbol 1 | symbol 2 | symbol 3 |
|---|---|---|---|---|
| 0 | | | | |
| 1 | | | | |
| 2 | | | | |
| 3 | | | | |
| 4 | | | | |
| 5 | | | | |
| 6 | | | | |
| 7 | | | | |
| 8 | | | | |
| 9 | | | | |
| 10 | | | | |
| 11 | | | | |
| 12 | | | | |
| 13 | | | | |
| 14 | | | | |
| 15 | | | | |
| 16 | | | | |
| 17 | | | | |
| 18 | | | | |
| 19 | | | | |
| | PSS | PBCH | SSS/ PBCH | PBCH |

642
Second SSB transmission including PBCH RBs in lower region within operating band maximum bandwidth

| RB index | symbol 0 | symbol 1 | symbol 2 | symbol 3 |
|---|---|---|---|---|
| 0 | | | | |
| 1 | | | | |
| 2 | | | | |
| 3 | | | | |
| 4 | | | | |
| 5 | | | | |
| 6 | | | | |
| 7 | | | | |
| 8 | | | | |
| 9 | | | | |
| 10 | | | | |
| 11 | | | | |
| 12 | | | | |
| 13 | | | | |
| 14 | | | | |
| 15 | | | | |
| 16 | | | | |
| 17 | | | | |
| 18 | | | | |
| 19 | | | | |
| | PSS | PBCH | SSS/ PBCH | PBCH |

SYNCHRONIZATION SIGNAL BLOCK CONFIGURATION FOR BANDWIDTH NARROWER THAN A MINIMUM BANDWIDTH

CROSS-REFERENCE TO RELATED APPLICATIONS

This Patent Application is a 371 national stage of PCT Application No. PCT/US2022/070285, filed on Jan. 21, 2022, entitled "SYNCHRONIZATION SIGNAL BLOCK CONFIGURATION FOR BANDWIDTH NARROWER THAN A MINIMUM BANDWIDTH," which claims priority to European Patent Application No. 21382072.3, filed on Jan. 29, 2021, entitled "SYNCHRONIZATION SIGNAL BLOCK CONFIGURATION FOR BANDWIDTH NARROWER THAN A MINIMUM BANDWIDTH." The disclosure of the prior Applications are considered part of and are hereby expressly incorporated by reference into this Patent Application.

FIELD OF THE DISCLOSURE

Aspects of the present disclosure generally relate to wireless communication and to techniques and apparatuses associated with a synchronization signal block (SSB) configuration for a bandwidth that is narrower than a minimum bandwidth.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving, from a base station, a synchronization signal block (SSB) associated with an SSB configuration for an operating band having a maximum bandwidth that is narrower than a minimum SSB bandwidth for an access link; and decoding the SSB based at least in part on the SSB configuration.

In some aspects, a method of wireless communication performed by a base station includes determining an SSB configuration for an operating band associated with the base station, wherein the operating band has a maximum bandwidth that is narrower than a minimum SSB bandwidth for an access link; and transmitting an SSB based at least in part on the SSB configuration.

In some aspects, a UE for wireless communication includes a memory and one or more processors operatively coupled to the memory, the memory and the one or more processors configured to: receive, from a base station, an SSB associated with an SSB configuration for an operating band having a maximum bandwidth that is narrower than a minimum SSB bandwidth for an access link; and decode the SSB based at least in part on the SSB configuration.

In some aspects, a base station for wireless communication includes a memory and one or more processors operatively coupled to the memory, the memory and the one or more processors configured to: determine an SSB configuration for an operating band associated with the base station, wherein the operating band has a maximum bandwidth that is narrower than a minimum SSB bandwidth for an access link; and transmit an SSB based at least in part on the SSB configuration.

In some aspects, a non-transitory computer-readable medium storing a set of instructions for wireless communication includes one or more instructions that, when executed by one or more processors of a UE, cause the UE to: receive, from a base station, an SSB associated with an SSB configuration for an operating band having a maximum bandwidth that is narrower than a minimum SSB bandwidth for an access link; and decode the SSB based at least in part on the SSB configuration.

In some aspects, a non-transitory computer-readable medium storing a set of instructions for wireless communication includes one or more instructions that, when executed by one or more processors of a base station, cause the base station to: determine an SSB configuration for an operating band associated with the base station, wherein the operating band has a maximum bandwidth that is narrower than a minimum SSB bandwidth for an access link; and transmit an SSB based at least in part on the SSB configuration.

In some aspects, an apparatus for wireless communication includes means for receiving, from a base station, an SSB associated with an SSB configuration for an operating band having a maximum bandwidth that is narrower than a minimum SSB bandwidth for an access link; and means for decoding the SSB based at least in part on the SSB configuration.

In some aspects, an apparatus for wireless communication includes means for determining an SSB configuration for an operating band associated with the apparatus, wherein the operating band has a maximum bandwidth that is narrower than a minimum SSB bandwidth for an access link; and means for transmitting an SSB based at least in part on the SSB configuration.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
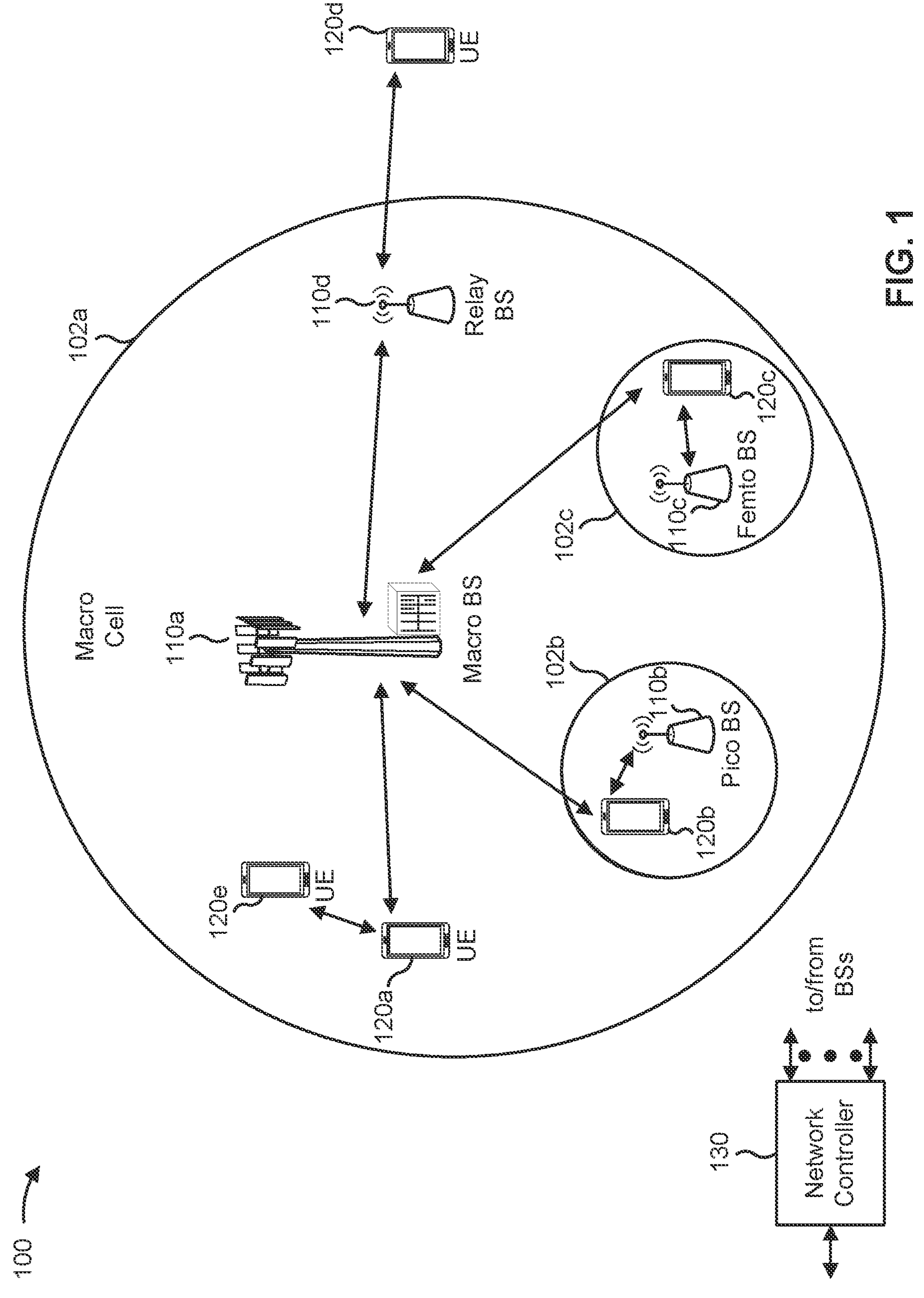
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies below 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., below 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
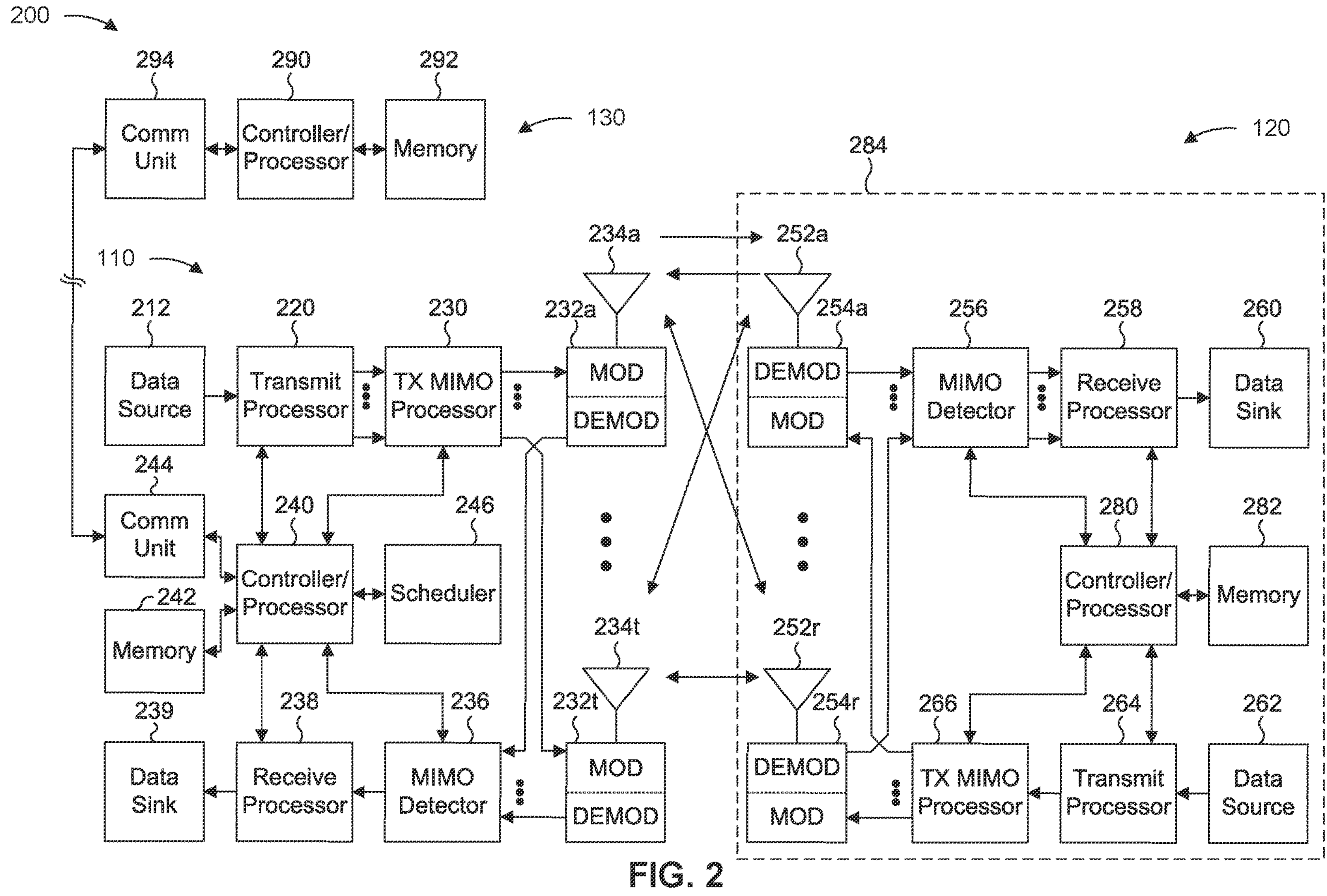
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term “controller/processor” may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 6A-6E.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 6A-6E.

Controller/processor 240 of base station 110, controller/processor 280 of UE 120, and/or any other component(s) of FIG. 2 may perform one or more techniques associated with a synchronization signal block (SSB) configuration for a bandwidth that is narrower than a minimum bandwidth, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some aspects, executing instructions may include running the instructions, converting the instructions, compiling the instructions, and/or interpreting the instructions, among other examples.

In some aspects, the UE 120 includes means for receiving, from the base station 110, an SSB associated with an SSB configuration for an operating band having a maximum bandwidth that is narrower than a minimum SSB bandwidth for an access link; and/or means for decoding the SSB based at least in part on the SSB configuration. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE 120 includes means for refraining from performing channel estimation using a physical broadcast channel (PBCH) demodulation reference signal (DMRS) in one or more punctured edges of the SSB; and/or means for decoding only a set of resource blocks (RBs) in a frequency region of the SSB that is within the maximum bandwidth of the operating band.

In some aspects, the UE 120 includes means for determining the one or more punctured edges based at least in part on a configuration associated with the operating band or based at least in part on blind detection of a pseudo-noise (PN) sequence associated with a PBCH in the frequency region of the SSB that is within the maximum bandwidth of the operating band.

In some aspects, the UE 120 includes means for combining a first portion of a PBCH carried in an upper frequency region in a first SSB occasion with a second portion of the PBCH carried in a lower frequency region in a second SSB occasion.

In some aspects, the base station 110 includes means for determining an SSB configuration for an operating band associated with the base station 110, wherein the operating band has a maximum bandwidth that is narrower than a minimum SSB bandwidth for an access link; and/or means for transmitting an SSB based at least in part on the SSB configuration. The means for the base station 110 to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
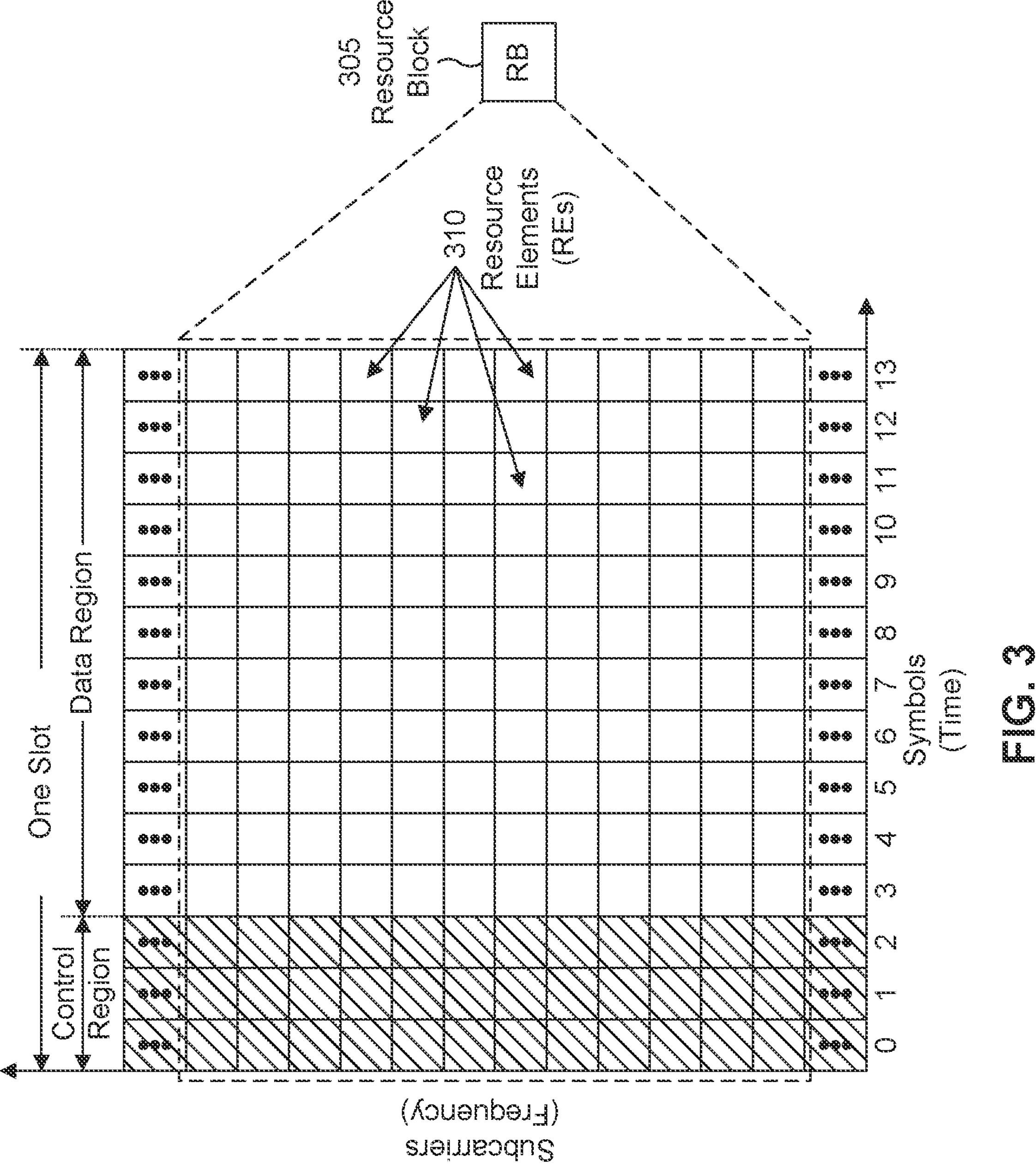
FIG. 3 is a diagram illustrating an example of a slot format, in accordance with the present disclosure.

FIG. 3 is a diagram illustrating an example 300 of a slot format, in accordance with the present disclosure. As shown in FIG. 3, time-frequency resources in a radio access network may be partitioned into resource blocks, shown by a single resource block (RB) 305. An RB 305 is sometimes referred to as a physical resource block (PRB). An RB 305 includes a set of subcarriers (e.g., 12 subcarriers) and a set of symbols (e.g., 14 symbols) that are schedulable by a base station 110 as a unit. In some aspects, an RB 305 may include a set of subcarriers in a single slot. As shown, a single time-frequency resource included in an RB 305 may be referred to as a resource element (RE) 310. An RE 310 may include a single subcarrier (e.g., in frequency) and a single symbol (e.g., in time). A symbol may be referred to as an orthogonal frequency division multiplexing (OFDM) symbol. An RE 310 may be used to transmit one modulated symbol, which may be a real value or a complex value.

In some telecommunication systems (e.g., NR), RBs 305 may span 12 subcarriers with a subcarrier spacing of, for example, 15 kilohertz (kHz), 30 kHz, 60 kHz, or 120 kHz, among other examples, over a 0.1 millisecond (ms) duration. A radio frame may include 40 slots and may have a length of 10 ms. Consequently, each slot may have a length of 0.25 ms. However, a slot length may vary depending on a numerology used to communicate (e.g., a subcarrier spacing and/or a cyclic prefix format). A slot may be configured with a link direction (e.g., downlink or uplink) for transmission. In some aspects, the link direction for a slot may be dynamically configured.

As indicated above, FIG. 3 is provided as an example. Other examples may differ from what is described with respect to FIG. 3.

Figure 4:
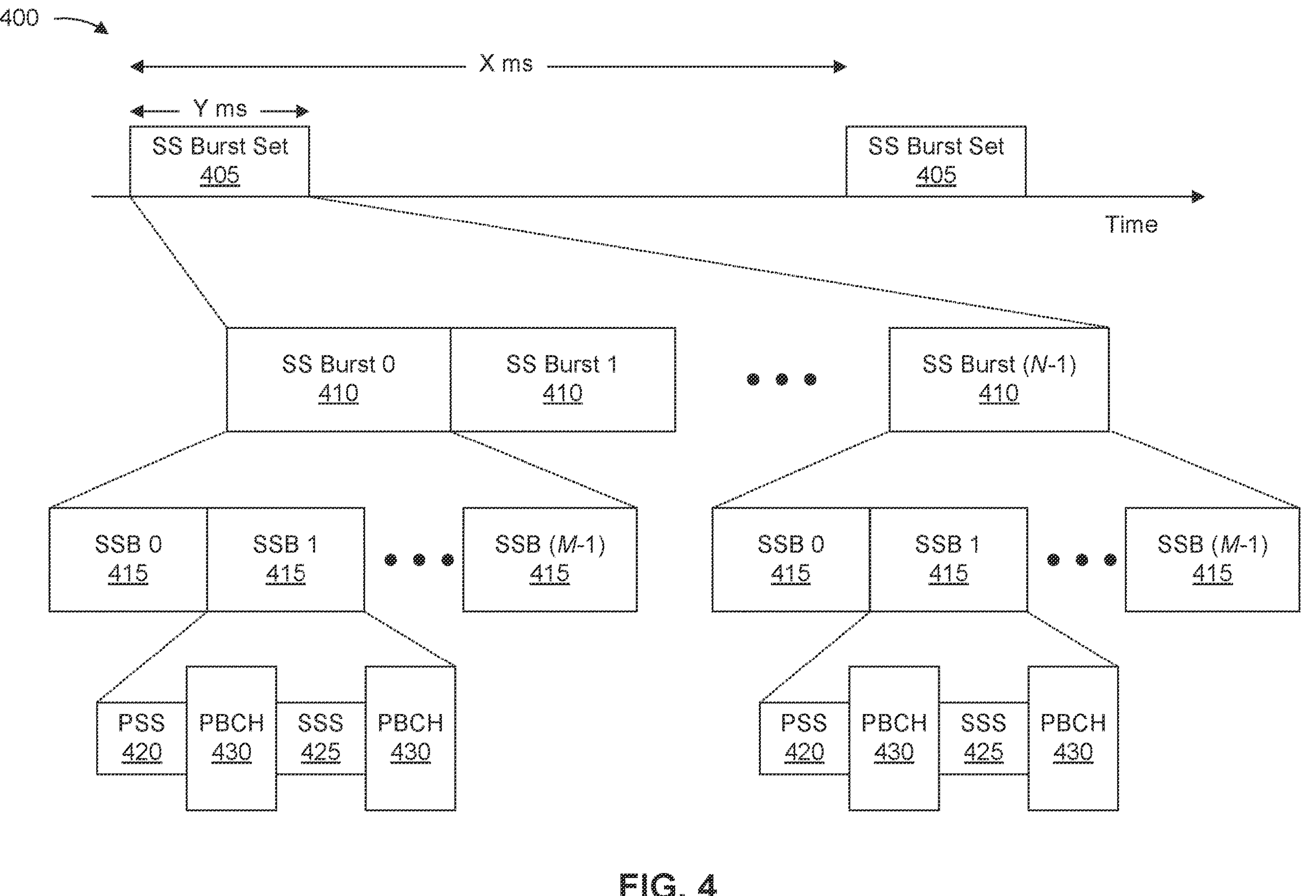
FIG. 4 is a diagram illustrating an example of a synchronization signal hierarchy, in accordance with the present disclosure.

FIG. 4 is a diagram illustrating an example 400 of a synchronization signal (SS) hierarchy, in accordance with the present disclosure. As shown in FIG. 4, the SS hierarchy may include an SS burst set 405, which may include multiple SS bursts 410, shown as SS burst 0 through SS burst N−1, where N is a maximum number of repetitions of the SS burst 410 that may be transmitted by a base station. As further shown, each SS burst 410 may include one or more SS blocks (SSBs) 415, shown as SSB 0 through SSB M−1, where M is a maximum number of SSBs 415 that can be carried by an SS burst 410. In some aspects, different SSBs 415 may be beam-formed differently (e.g., transmitted using different beams), and may be used for cell search, cell acquisition, beam management, and/or beam selection (e.g., as part of an initial network access procedure). For example, in some aspects, the base station may transmit multiple SSBs on multiple corresponding beams, and the SSBs may be used for beam selection. An SS burst set 405 may be periodically transmitted by a wireless node (e.g., base station 110), such as every X milliseconds, as shown in FIG. 4. In some aspects, an SS burst set 405 may have a fixed or dynamic length, shown as Y milliseconds in FIG. 4. In some cases, an SS burst set 405 or an SS burst 410 may be referred to as a discovery reference signal (DRS) transmission window or an SSB measurement time configuration (SMTC) window.

In some aspects, an SSB 415 may include resources that carry a primary synchronization signal (PSS) 420, a secondary synchronization signal (SSS) 425, and/or a physical broadcast channel (PBCH) 430. In some aspects, the PSS 420, the SSS 425, and the PBCH 430 may carry information used for initial network acquisition and synchronization. In some aspects, the PBCH 430 may include a DMRS, which may carry information used to estimate a radio channel for demodulation of the PBCH 430. The design and mapping of the DMRS may be specific to the PBCH 430 for which the DMRS is used for channel estimation. In some aspects, the DMRS can be beamformed, can be confined in a resource (e.g., rather than transmitted on a wideband), and can be transmitted only when necessary. In some aspects, multiple SSBs 415 are included in an SS burst 410 (e.g., with transmission on different beams), and the PSS 420, the SSS 425, and/or the PBCH 430 may be the same across each SSB 415 of the SS burst 410. In some aspects, a single SSB 415 may be included in an SS burst 410. In some aspects, the SSB 415 may be at least four symbols (e.g., OFDM symbols) in length, where each symbol carries one or more of the PSS 420 (e.g., occupying one symbol), the SSS 425 (e.g., occupying one symbol), and/or the PBCH 430 (e.g., occupying two symbols). In some aspects, an SSB 415 may be referred to as an SS/PBCH block.

In some aspects, the symbols of an SSB 415 are consecutive, as shown in FIG. 4. In some aspects, the symbols of an SSB 415 are non-consecutive. Similarly, in some aspects, one or more SSBs 415 of the SS burst 410 may be transmitted in consecutive radio resources (e.g., consecutive symbols) during one or more slots. Additionally, or alternatively, one or more SSBs 415 of the SS burst 410 may be transmitted in non-consecutive radio resources.

In some aspects, the SS bursts 410 may have a burst period, and the SSBs 415 of the SS burst 410 may be transmitted by a wireless node (e.g., base station 110) according to the burst period. In this case, the SSBs 415 may be repeated during each SS burst 410. In some aspects, the SS burst set 405 may have a burst set periodicity, whereby the SS bursts 410 of the SS burst set 405 are transmitted by the wireless node according to the fixed burst set periodicity. In other words, the SS bursts 410 may be repeated during each SS burst set 405.

In some aspects, an SSB 415 may include an SSB index, which may correspond to a beam used to carry the SSB 415. A UE 120 may monitor for and/or measure SSBs 415 using different receive (Rx) beams during an initial network access procedure and/or a cell search procedure, among other examples. Based at least in part on the monitoring and/or measuring, the UE 120 may indicate one or more SSBs 415 with a best signal parameter (e.g., a reference signal received power (RSRP) parameter) to a base station 110. The base station 110 and the UE 120 may use the one or more indicated SSBs 415 to select one or more beams to be used for communication between the base station 110 and the UE 120 (e.g., for a random access channel (RACH) procedure). Additionally, or alternatively, the UE 120 may use the SSB 415 and/or the SSB index to determine a cell timing for a cell via which the SSB 415 is received (e.g., a serving cell).

As indicated above, FIG. 4 is provided as an example. Other examples may differ from what is described with regard to FIG. 4.

Figure 5:
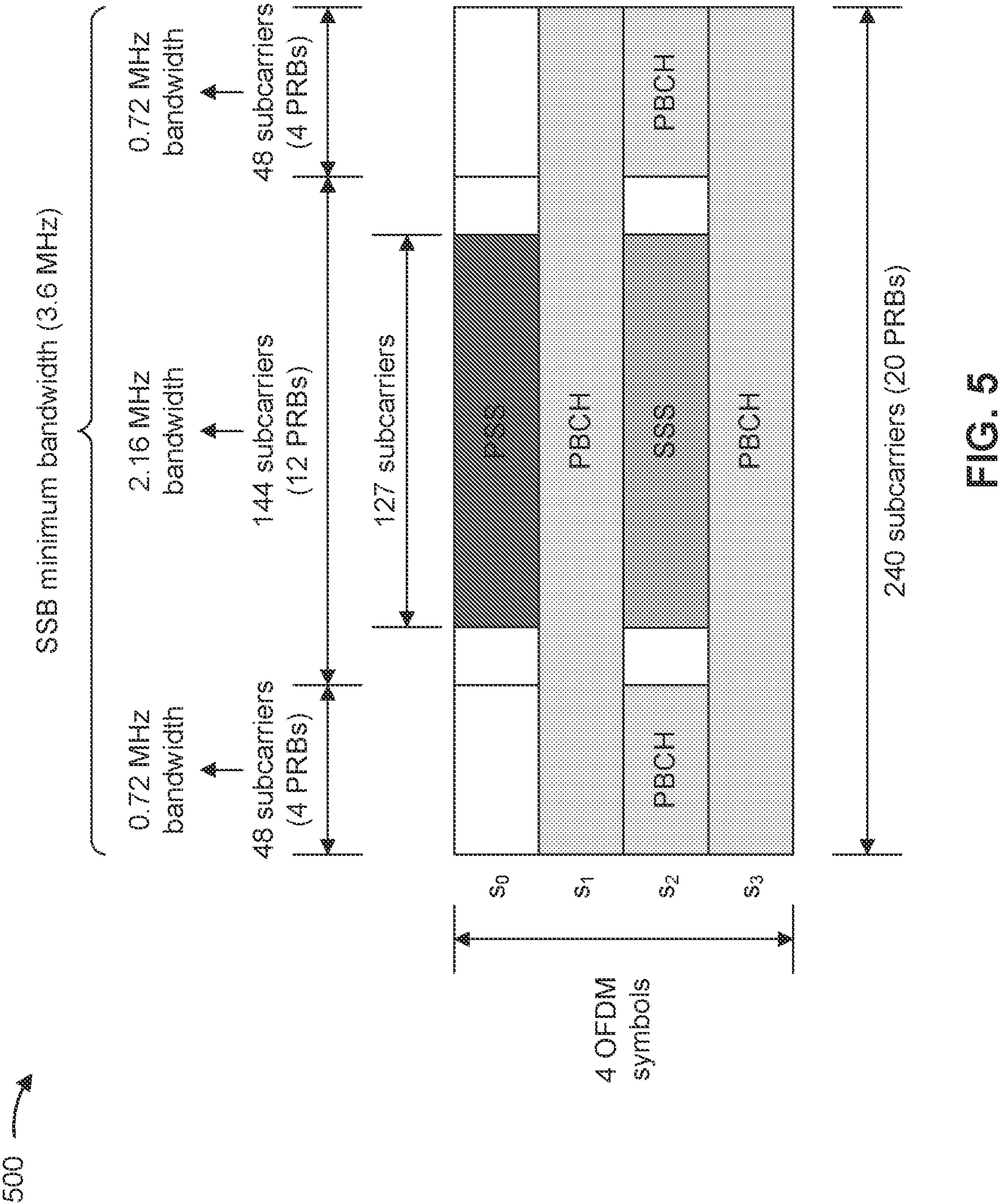
FIG. 5 is a diagram illustrating an example of a synchronization signal block (SSB) configuration, in accordance with the present disclosure.

FIG. 5 is a diagram illustrating an example 500 of an SSB configuration, in accordance with the present disclosure. In some aspects, as described herein, the SSB configuration shown in FIG. 5 corresponds to a time-frequency structure associated with an SSB that a base station periodically broadcasts or otherwise transmits over an access link (e.g., a Uu interface) to enable initial network acquisition and synchronization for a UE. Additionally, or alternatively, the SSB configuration shown in FIG. 5 may be used for cell search on an access link, beam management on an access link, and/or beam selection on an access link, among other examples. For example, as shown, the SSB may include a primary synchronization signal (PSS), a secondary synchronization signal (SSS), and a physical broadcast channel (PBCH) carrying information that a UE may use to derive, decode, or otherwise obtain necessary information to access a cell provided by the base station (e.g., a radio frame boundary, a physical cell identity, and/or a master information block (MIB) that provides parameters to acquire system information block Type 1 (SIB1), among other examples). Furthermore, in some aspects, the PBCH includes a DMRS (which may be referred to herein as a PBCH DMRS), which carries a pseudo-noise (PN) sequence or other suitable information to enable a UE to perform channel estimation to demodulate or decode the PBCH.

In general, as shown in FIG. 5, each SSB transmitted on an access link occupies four (4) consecutive symbols in a time domain (shown as $s_0$ through $s_3$) and includes a PSS, SSS, and PBCH spread over 240 subcarriers in a frequency domain (e.g., 20 RBs that each include 12 subcarriers). As shown in FIG. 5, the PSS occupies the first symbol ($s_0$) and spans 127 subcarriers, and the SSS is located in the third symbol ($s_2$) and spans 127 subcarriers, with 8 unused subcarriers above the SSS and 9 unused subcarriers below the SSS. As further shown in FIG. 5, the PBCH occupies two full symbols, spanning 240 subcarriers in the second symbol ($s_1$) and the fourth symbol ($s_3$), and the PBCH partially occupies the third symbol ($s_2$), spanning 48 subcarriers above the SSS and 48 subcarriers below the SSS, whereby the PBCH occupies 576 subcarriers across three symbols. Furthermore, the PBCH DMRS occupies three (3) REs in each RB allocated to the PBCH, whereby the PBCH DMRS occupies 144 REs across three symbols (e.g., 3 REs in each of 48 RBs allocated to the PBCH) and the remaining 432 REs in the 48 RBs allocated to the PBCH carry the PBCH payload.

Accordingly, based on the SSB configuration shown in FIG. 5, an SSB in an NR network generally has a minimum bandwidth that is based at least in part on a subcarrier spacing. For example, in an NR network, a subcarrier spacing can be 15 kHz, 30 kHz, 60 kHz, and/or 120 kHz. In cases where a base station communicates in an operating band that uses the lowest possible subcarrier spacing of 15 kHz, each RB may require a bandwidth of 0.18 MHz (e.g., based on each RB including 12 subcarriers). Accordingly, because the SSB spans 240 subcarriers across 20 RBs and the smallest subcarrier spacing supported in an NR network is 15 kHz, the minimum bandwidth for an SSB in an NR network is 3.6 MHz. However, in some cases, a base station may communicate in an operating band having a maximum bandwidth that is narrower than the minimum SSB bandwidth of 3.6 MHz, which may prevent the base station from communicating using an NR RAT. For example, in some cases, a base station may communicate using frequency division duplexing (FDD) in the 900 MHz band (sometimes referred to as the 33-centimeter band), which includes 5 MHz of spectrum between 896-901 MHz and another 5 MHz of spectrum between 935-940 MHz. For example, the base station may be allocated 3 MHz of spectrum to use for uplink communication and 3 MHz of spectrum to use for downlink communication, which is below the minimum SSB bandwidth of 3.6 MHz. Accordingly, when the base station is configured to communicate in an operating band that has a maximum bandwidth below the minimum SSB bandwidth (e.g., a bandwidth below 3.6 MHz), the base station cannot properly encode or otherwise configure an SSB, which is an always-on signal that includes the minimum necessary signals to enable access to an NR network.

Some aspects described herein relate to techniques and apparatuses to enable an SSB configuration for an operating band that has a maximum bandwidth that is narrower than a minimum SSB bandwidth. For example, in cases where the minimum SSB bandwidth is 3.6 MHz and the maximum bandwidth of the operating band is 3 MHz, some aspects described herein enable SSB configurations that occupy less than 3 MHz. More generally, as described herein, some aspects may provide SSB configurations that occupy a bandwidth within the maximum bandwidth of the operating band in cases where the maximum bandwidth of the operating band is narrower than the minimum SSB bandwidth. In this way, a base station may configure and transmit an SSB that carries the minimum necessary signals to enable access to an NR network (e.g., a PSS, SSS, and PBCH), which may significantly expand the spectrum in which NR can be deployed. For example, by enabling a base station to configure and transmit an SSB that occupies less than the minimum SSB bandwidth, NR can be deployed in low-band spectrum that may be well-suited to cover large areas and/or other limited spectrum (e.g., to enable broadband services in a utility grid private network or other industries).

As indicated above, FIG. 5 is provided as an example. Other examples may differ from what is described with regard to FIG. 5.

Figure 6A:
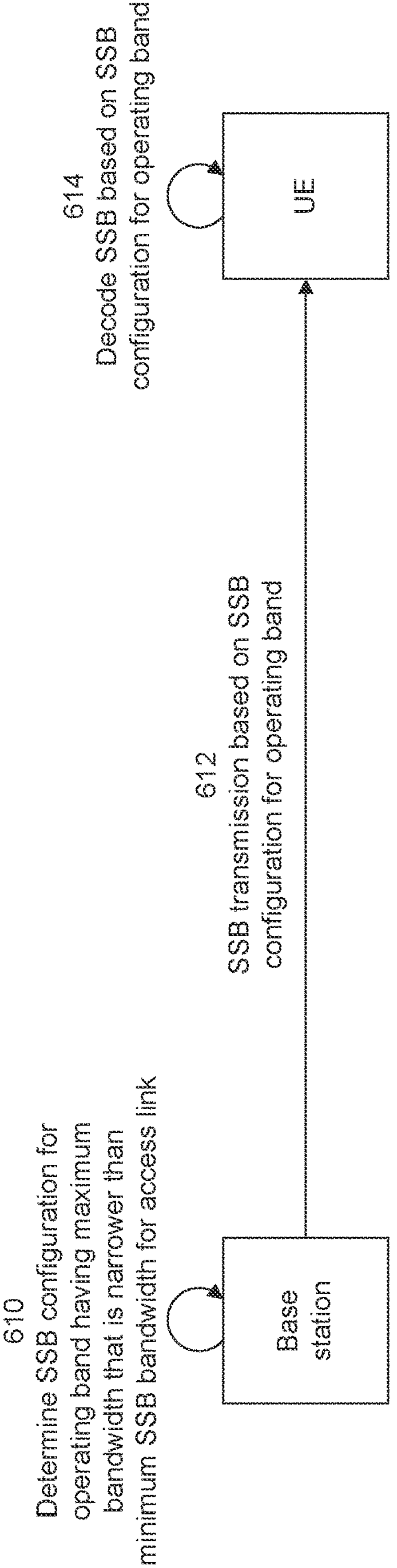
FIGS. 6A-6E are diagrams illustrating examples associated with an SSB configuration for a bandwidth that is narrower than a minimum bandwidth, in accordance with the present disclosure.

FIGS. 6A-6E are diagrams illustrating examples 600 associated with an SSB configuration for a bandwidth that is narrower than a minimum bandwidth, in accordance with the present disclosure. As shown in FIG. 6A, example(s) 600 includes communication between a base station (e.g., base station 110) and a UE (e.g., UE 120). In some aspects, the base station and the UE may communicate in a wireless network, such as wireless network 100. As described herein, the base station and the UE may communicate via a wireless access link, which may include an uplink and a downlink. Furthermore, as described herein, the base station may be configured to communicate using an operating band with a maximum bandwidth that is narrower than a minimum SSB bandwidth. For example, the base station may be configured to communicate on a downlink using up to 3 MHz of spectrum in the 900 MHz band, which is below the 3.6 MHz minimum bandwidth for an SSB in an NR network. However, it will be appreciated that aspects described herein may be applied in any suitable operating band in which the maximum bandwidth is narrower than the minimum SSB bandwidth.

As shown in FIG. 6A, and by reference number 610, the base station may determine an SSB configuration for the operating band based at least in part on the operating band having a maximum bandwidth that is narrower than the minimum SSB bandwidth for the wireless access link. For example, as described in further detail below with reference to FIG. 6B, the base station may puncture one or more edges of a legacy SSB (e.g., an SSB configured as shown in FIG. 5) and only transmit a set of RBs in a frequency region that is within the maximum bandwidth of the operating band. In this case, the base station does not transmit PBCH RBs that are located in the punctured edge(s) (e.g., outside the frequency region that is within the maximum bandwidth of the operating band). Additionally, or alternatively, as described in further detail below with reference to FIG. 6C, the SSB configuration may include an additional (fifth) symbol that is added to the legacy SSB configuration to carry the PBCH RBs located in the punctured edge(s). Additionally, or alternatively, as described in further detail below with reference to FIG. 6D, the base station may separate the legacy SSB into two parts, including a first part in an upper frequency region and a second part in a lower frequency region. In this case, the first part may be transmitted in a first SSB occasion and the second part may be transmitted in a second SSB occasion that is time division multiplexed (TDMed) with the first SSB occasion. Additionally, or alternatively, as described in further detail below with reference to FIG. 6E, the base station may repurpose a sidelink SSB configuration for the access link in cases where the maximum bandwidth of the operating band is narrower than the minimum sidelink SSB bandwidth (e.g., 1.98 MHz based on a minimum subcarrier spacing of 15 kHz for a sidelink SSB configuration that spans eleven (11) RBs in the frequency domain).

As further shown in FIG. 6A, and by reference number 612, the base station may transmit SSBs based on the SSB configuration for the operating band. For example, as described above, the SSB is an always-on signal that includes the minimum necessary signals to enable access to a cell provided by the base station. Accordingly, as described in further detail above with reference to FIG. 4, the base station may periodically transmit an SS burst that carries multiple SSBs, each of which is transmitted via a specific beam with a pre-specified interval and direction. In general, each SSB may be configured as shown in one or more of FIGS. 6B-6E, which are described in more detail below. Furthermore, in cases where the SSB is divided into multiple parts (e.g., as shown in FIG. 6D), the base station may transmit a first part of the SSB in a first SSB occasion and second part of the SSB in a second SSB occasion that is TDMed with the first SSB occasion.

As further shown in FIG. 6A, and by reference number 614, the UE may receive and decode the SSB based at least in part on the SSB configuration for the operating band. For example, in some aspects, the SSB configuration may be predefined for the operating band, or the UE may determine the SSB configuration by perform blind decoding of a PN sequence for the PBCH DMRS. In such cases, the UE may determine the punctured edge(s) of the SSB based on the predefined SSB configuration for the operating band and/or the blind decoding, whereby the UE may refrain from using the PBCH DMRS in the punctured edge(s) for channel estimation, and may decode only the RBs that are located in the frequency region that is within the maximum bandwidth of the operating band. Additionally, or alternatively, in cases where an additional symbol is added to the SSB to carry the PBCH RBs in the punctured edge(s), the SSB may reuse a legacy DMRS sequence and an RE mapping for the PBCH may be modified to indicate the location of the PBCH REs and/or the PBCH DMRS REs in the additional symbol. Additionally, or alternatively, in cases where the SSB is transmitted in separate (e.g., overlapping) parts in different SSB occasions, the UE may combine the separate parts that are transmitted in the different SSB occasions. Additionally, or alternatively, in cases where the sidelink SSB configuration is repurposed for the access link, the UE may decode the SSB in a similar manner as a sidelink SSB, except that a final symbol of the SSB may be repurposed for the FDD operating band (e.g., to send a repeated PSS, SSS, or PBCH symbol, and/or to send another downlink transmission).

Figure 6B:
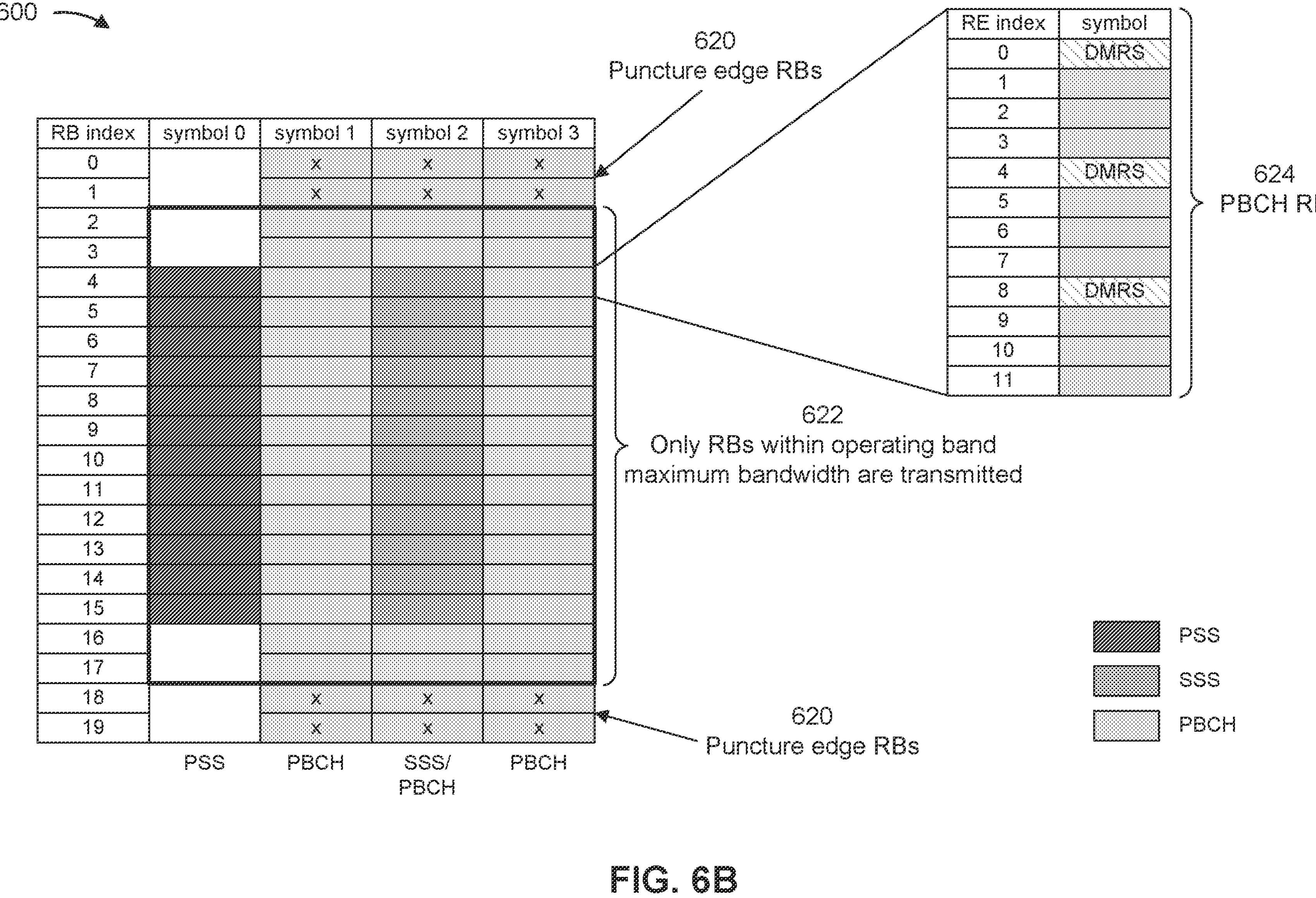

In some aspects, as shown in FIG. 6B and described above, the SSB configuration for the operating band may be based on the legacy SSB configuration shown in FIG. 5, except that one or more edges of the legacy SSB may be punctured. For example, as shown by reference number 620, one or more RBs may be punctured in an upper frequency region and/or a lower frequency region. Accordingly, as shown by reference number 622, the base station may transmit only a set of RBs that are within the maximum bandwidth of the operating band. For example, as shown, the PSS and the SSS may generally occupy a center frequency region of the SSB (e.g., including 127 subcarriers spanning 12 RBs), and only the PBCH occupies the edges of the SSB (e.g., the upper four RBs and the lower four RBs). Accordingly, the one or more edges may be punctured such that no changes to the legacy SSB configuration are needed for the PSS and SSS in the center frequency region, and one or more techniques described herein may be used to compensate for puncturing the PBCH RBs located outside the frequency region that is within the maximum bandwidth of the operating band.

In the example shown in FIG. 6B, the base station may be configured to communicate in an operating band having a maximum bandwidth of 3 MHz, and may puncture the two uppermost RBs and the two lowermost RBs such that the base station only transmits a center frequency region that includes 16 RBs, which corresponds to 2.88 MHz at a 15 kHz subcarrier spacing. Alternatively, in some aspects, the four uppermost RBs in one edge (RBs indexed from 0 to 4) may be punctured and the base station may transmit the RBs indexed from 4 to 19, or the four lowermost RBs in one edge (RBs indexed from 16 to 19) may be punctured and the base station may transmit the RBs indexed from 0 to 15. Furthermore, it will be appreciated that the quantity of RBs that are punctured in the one or more edges and/or the frequency region of the RBs that are transmitted may vary depending on the maximum bandwidth of the operating band and/or the minimum SSB bandwidth. For example, if the maximum bandwidth of the operating band is higher than 3.24 MHz, the base station may puncture two RBs (e.g., two RBs in one edge or one RB in each edge) and transmit RBs in a frequency region spanning 18 RBs, or 3.24 MHz at a 15 kHz subcarrier spacing. In another example, if the maximum bandwidth of the operating band is below 2.88 MHz, the base station may puncture five or more RBs (e.g., two RBs in one edge and three RBs in another edge) and transmit RBs in a frequency region spanning a number RBs that is within the maximum bandwidth of the operating band.

In some aspects, as described above, the RBs may generally be punctured in one or more edges of the legacy SSB that are occupied only by the PBCH. Accordingly, the 127 subcarriers for the PSS and SSS may be reused in a similar manner as the legacy SSB configuration. Furthermore, because the UE generally expects the SSS and PBCH to have an equivalent energy per resource element (EPRE) due to the SSS and PBCH both occupying the third symbol, the base station may perform power boosting for the RBs in the transmitted frequency region to ensure that the SSS and PBCH DMRS have an equivalent EPRE. Furthermore, the power boosting may compensate for performance loss that the puncturing may cause for the PBCH. In some aspects, when decoding the SSB that is configured as shown in FIG. 6B, the SSB puncturing may be indicated to the UE to avoid performance loss that may otherwise occur if the UE were to use the punctured PBCH DMRS for channel estimation. For example, as shown in FIG. 6B, each PBCH RB includes twelve (12) REs, which include three (3) REs occupied by the PBCH DMRS and nine (9) REs occupied by the PBCH payload. Accordingly, the UE may determine the one or more punctured edges of the SSB, and may refrain from performing channel estimation using the PBCH DMRS in the punctured edge(s), and may decode only the set of RBs that are transmitted (e.g., located in the frequency region that is within the maximum bandwidth of the operating band). In this case, the puncturing may not have a significant impact on the UE decoding the PBCH RBs in the transmitted (unpunctured) frequency region because a legacy PBCH typically has a low coding rate (e.g., $1/16$) to enable robust PBCH detection. Additionally, or alternatively, the PBCH may generally include a set of bits, part of which is predefined (e.g., for the operating band), which improves PBCH detection performance by enabling the UE to decode only the remaining unknown bits from the unpunctured frequency region within the maximum bandwidth of the operating band.

In some aspects, as described above, the punctured edge(s) of the SSB may be predefined for the operating band associated with the base station, or the UE may determine the punctured edge(s) by performing blind detection of a 108-length PN sequence for the PBCH DMRS transmitted in the unpunctured frequency region that is within the maximum bandwidth of the operating band. For example, FIG. 6B illustrates a case where the unpunctured frequency region includes sixteen (16) RBs, spanning 2.88 MHz. In this case, the PBCH occupies 16 RBs in the second symbol, 4 RBs in the third symbol, and 16 RBs in the fourth symbol, for a total of 36 RBs. Accordingly, because each PBCH RB includes three REs allocated to the PBCH DMRS, the PN sequence for the PBCH DMRS has a length of 108 (e.g., 3 REs allocated to the PBCH DMRS in each of 36 PBCH RBs). In this case, because the PBCH DMRS has a length of 144 in a legacy SSB (e.g., 3 REs allocated to the PBCH DMRS in each of 48 PBCH RBs), the UE may determine the punctured edge(s) based at least in part on the shorter length of PBCH DMRS relative to the legacy PBCH (e.g., a PBCH DMRS having a length of 108 indicates 12 PBCH RBs are punctured in the edge(s) of the SSB).

Figure 6C:
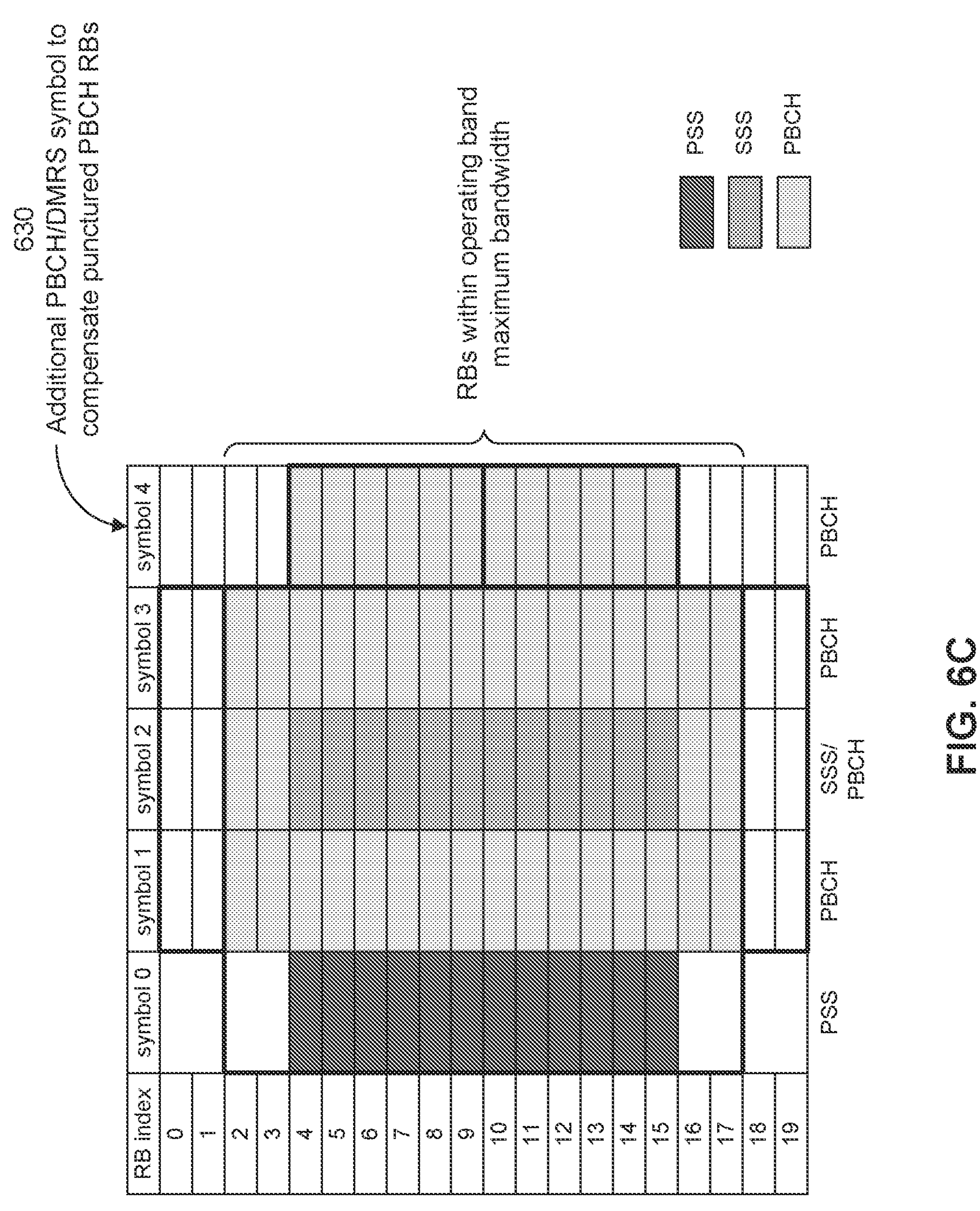
Figure 6D:
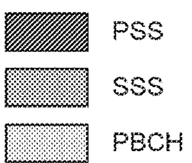

In some aspects, as shown in FIG. 6C, and by reference number 630, the SSB configuration for the operating band may include an additional (e.g., fifth) symbol that may be dedicated to carrying the PBCH/DMRS to compensate for the punctured PBCH RBs in the second through fourth symbols. For example, if N PBCH RBs are punctured in the second through fourth symbols, the additional symbol may include N PBCH RBs to compensate the legacy PBCH RBs located outside the unpunctured/transmitted frequency region that is within the maximum bandwidth of the operating band. In this case, the PSS and SSS with 127 subcarriers may be reused, and the same coding rate may be used for the PBCH because the punctured PBCH RBs are transmitted in the additional symbol. Furthermore, in this case, the legacy 144-length sequence can be used for the PBCH DMRS, because all 48 PBCH RBs are transmitted. Furthermore, in this case, an RE mapping for the PBCH/DMRS may be modified to indicate the locations of the PBCH DMRS REs within the SSB. For example, the RE mapping may indicate the locations of the PBCH DMRS REs that span the entire transmitted frequency region in the first PBCH symbol, a set of RBs at the edge(s) of the SSS in the second PBCH symbol, the entire transmitted frequency region in the third PBCH symbol, and the added RBs in the fourth PBCH symbol. For example, in FIG. 6C, the RE mapping may indicate the locations of the REs that carry the PBCH DMRS in the first PBCH symbol with 16 PBCH RBs, the second PBCH symbol with 4 PBCH RBs at the edge(s) of the SSS, the third PBCH symbol with 16 PBCH RBs, and the fourth PBCH symbol with 12 added PBCH RBs to compensate the 12 legacy PBCH RBs outside the frequency region within the maximum bandwidth of the operating band.

In some aspects, as shown in FIG. 6D, the SSB configuration may be associated with a TDMed truncated PBCH transmission in multiple SSB occasions. For example, as shown by reference number 640 and 642, the RBs associated with the legacy PBCH may be separated into two parts, which include a first part in an upper frequency region that is within the maximum bandwidth of the operating band and a second part in a lower frequency region that is within the maximum bandwidth of the operating band. For example, in cases where the operating band has a maximum bandwidth between 2.88 MHz and 3.6 MHz, the first part may include the uppermost 16 RBs (e.g., RBs indexed from 9 to 15) and the second part may include the lowermost 16 RBs (e.g., RBs indexed from 4 to 19). In this way, the base station may send the first SSB transmission in a first SSB occasion and the second SSB transmission in a second SSB occasion that is TDMed with the first SSB occasion (e.g., occupies different time resources). Accordingly, when decoding the SSB, the UE may combine the first SSB transmission with the second SSB transmission (e.g., when there is a low signal-to-noise ratio (SNR)). Alternatively, the base station may transmit only the first SSB transmission or only the second SSB transmission using a puncturing configuration, as described above with reference to FIG. 6B. In this case, if the base station does not use power boosting to improve detection and decoding reliability for the transmitted RBs that are within the maximum bandwidth of the operating band, the UE may combine multiple SSBs across multiple SSB occasions to compensate for the performance loss due to the puncturing of the PBCH RBs outside the transmitted frequency region.

Figure 6E:
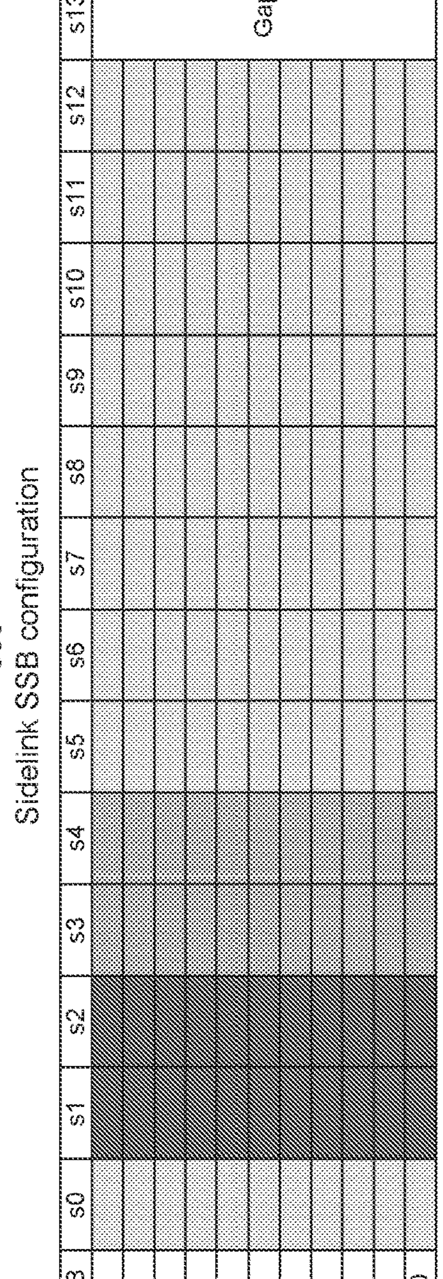
Figure 6E:
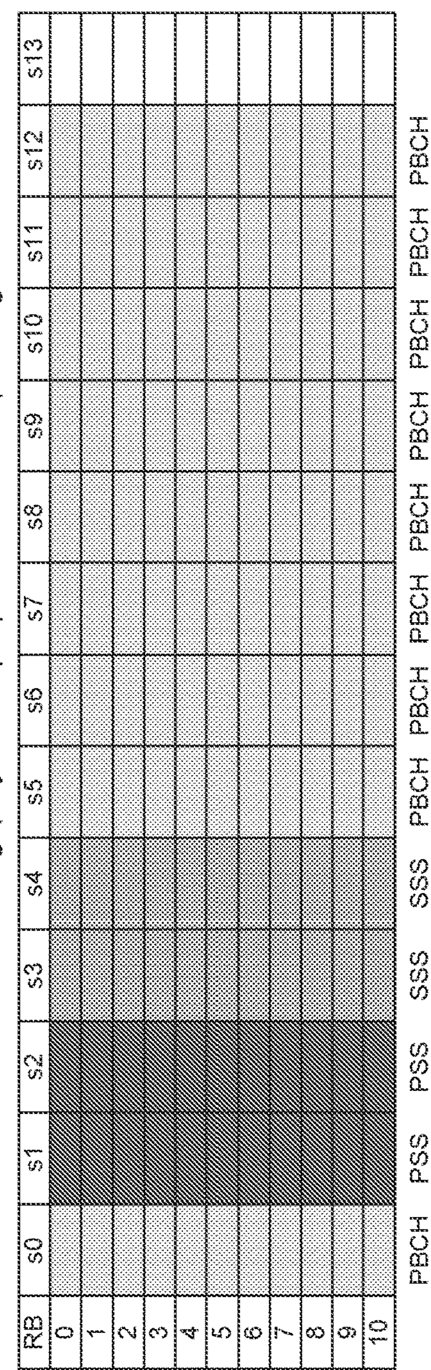

Alternatively, rather than modifying the legacy SSB configuration to fit within the maximum bandwidth of the operating band, the base station may repurpose a sidelink SSB configuration for the operating band in cases where the maximum bandwidth of the operating band is equal to or greater than the minimum bandwidth of a sidelink SSB. For example, as shown in FIG. 6E, and by reference number 650, a sidelink SSB configuration generally includes eleven (11) RBs over thirteen (13) symbols in a slot, where a physical sidelink broadcast channel (PSBCH) is transmitted in the first symbol ($s_0$) and the sixth through thirteenth symbols ($s_5$ through $s_{12}$), a sidelink PSS (S-PSS) is transmitted in the second and third symbols ($s_1$ and $s_2$), and a sidelink SSS (S-SSS) is transmitted in the fourth and fifth symbols ($s_3$ and $s_4$). In this case, the S-PSS and S-SSS may occupy 127 subcarriers and use the same sequences as a PSS and SSS used for an access link SSB, and the PSBCH/DMRS may occupy 132 subcarriers. In a sidelink SSB configuration, the last (fourteenth) symbol is reserved as a gap symbol for downlink/uplink returning due to the sidelink being configured as a time division duplexing (TDD) band.

Accordingly, as further shown in FIG. 6E, and by reference number 652, the sidelink SSB configuration may be substantially repurposed as an access link SSB if the maximum bandwidth of the operating band is equal to or greater than the minimum bandwidth of a sidelink SSB (e.g., 1.98 MHz based on a width of 11 RBs and a minimum subcarrier spacing of 15 kHz). In this case, as shown, the PBCH may be transmitted in the first symbol ($s_0$) and the sixth through thirteenth symbols ($s_5$ through $s_{12}$), the PSS may be transmitted in the second and third symbols ($s_1$ and $s_2$), and the SSS may be transmitted in the fourth and fifth symbols ($s_3$ and $s_4$). Furthermore, in cases where the operating band is configured for FDD communication (e.g., there is no need to perform downlink/uplink retuning because the band used to transmit the SSB is used for downlink communication only), the final symbol of the slot may be repurposed rather than left unused as a gap for downlink/uplink retuning. For example, the final symbol ($s_{13}$) may be used to transmit a repeated PSS symbol, to transmit a repeated SSS symbol, to transmit a repeated PBCH symbol (e.g., repeating the first PBCH symbol from symbol $s_0$ to improve frequency offset estimation), or to transmit another downlink transmission (e.g., SIB1 and/or a periodic channel state information reference signal (CSI-RS), among other examples).

As indicated above, FIGS. 6A-6E are provided as an example. Other examples may differ from what is described with regard to FIGS. 6A-6E.

Figure 7:
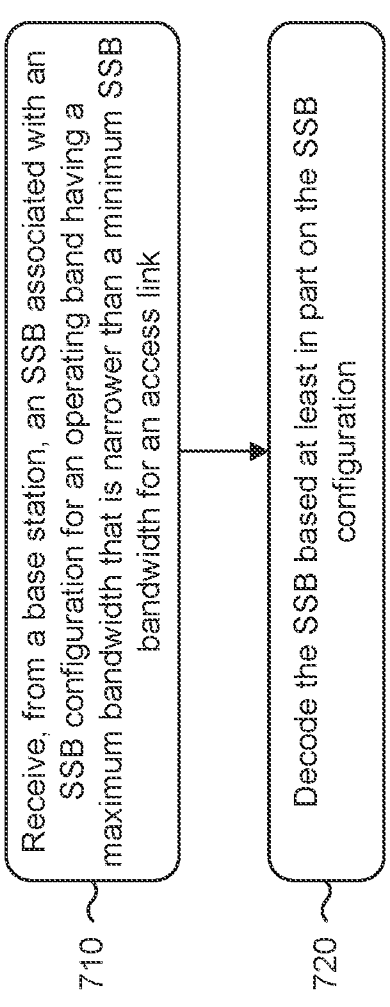
FIGS. 7-8 are diagrams illustrating example processes associated with an SSB configuration for a bandwidth that is narrower than a minimum bandwidth, in accordance with the present disclosure.

FIG. 7 is a diagram illustrating an example process 700 performed, for example, by a UE, in accordance with various aspects of the present disclosure. Example process 700 is an example where the UE (e.g., UE 120) performs operations associated with an SSB configuration for a bandwidth narrower than a minimum bandwidth.

As shown in FIG. 7, in some aspects, process 700 may include receiving, from a base station, an SSB associated with an SSB configuration for an operating band having a maximum bandwidth that is narrower than a minimum SSB bandwidth for an access link (block 710). For example, the UE (e.g., using reception component 902, depicted in FIG. 9) may receive, from a base station, an SSB associated with an SSB configuration for an operating band having a maximum bandwidth that is narrower than a minimum SSB bandwidth for an access link, as described above.

As further shown in FIG. 7, in some aspects, process 700 may include decoding the SSB based at least in part on the SSB configuration (block 720). For example, the UE (e.g., using decoding component 908, depicted in FIG. 9) may decode the SSB based at least in part on the SSB configuration, as described above.

Process 700 may include additional aspects, such as any single aspect or any combination of aspects described below and/or in connection with one or more other processes described elsewhere herein.

In a first aspect, the SSB includes one or more punctured edges such that the SSB includes a set of RBs only in a frequency region that is within the maximum bandwidth of the operating band.

In a second aspect, alone or in combination with the first aspect, a portion of bits transmitted in a PBCH of the SSB are predefined.

In a third aspect, alone or in combination with one or more of the first and second aspects, the set of RBs in the frequency region carry an SSS and a PBCH DMRS that have an equivalent EPRE.

In a fourth aspect, alone or in combination with one or more of the first through third aspects, decoding the SSB includes refraining from performing channel estimation using a PBCH DMRS in the one or more punctured edges, and decoding only the set of RBs in the frequency region of the SSB that is within the maximum bandwidth of the operating band.

In a fifth aspect, alone or in combination with one or more of the first through fourth aspects, decoding the SSB includes determining the one or more punctured edges based at least in part on a configuration associated with the operating band or based at least in part on blind detection of a PN sequence associated with a PBCH in the frequency region of the SSB that is within the maximum bandwidth of the operating band.

In a sixth aspect, alone or in combination with one or more of the first through fifth aspects, the SSB includes a symbol to carry one or more PBCH RBs located in the one or more punctured edges outside the frequency region of the SSB that is within the maximum bandwidth of the operating band.

In a seventh aspect, alone or in combination with one or more of the first through sixth aspects, the SSB configuration includes an RE mapping for the symbol to carry the one or more PBCH RBs.

In an eighth aspect, alone or in combination with one or more of the first through seventh aspects, the SSB includes a first set of RBs that are transmitted in a first SSB occasion only in an upper frequency region that is within the maximum bandwidth of the operating band, and a second set of RBs that are transmitted in a second SSB occasion only in a lower frequency region that is within the maximum bandwidth of the operating band.

In a ninth aspect, alone or in combination with one or more of the first through eighth aspects, decoding the SSB includes combining a first portion of a PBCH carried in the upper frequency region in the first SSB occasion with a second portion of the PBCH carried in the lower frequency region in the second SSB occasion.

In a tenth aspect, alone or in combination with one or more of the first through ninth aspects, the SSB configuration is based at least in part on a sidelink SSB configuration requiring a minimum bandwidth that is narrower than the maximum bandwidth of the operating band.

In an eleventh aspect, alone or in combination with one or more of the first through tenth aspects, the SSB configuration includes an initial group of symbols that carry a PSS, an SSS, and a PBCH, and wherein the SSB configuration further includes a final symbol that carries a repeated PSS symbol, a repeated SSS symbol, a repeated PBCH symbol, or a downlink transmission.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
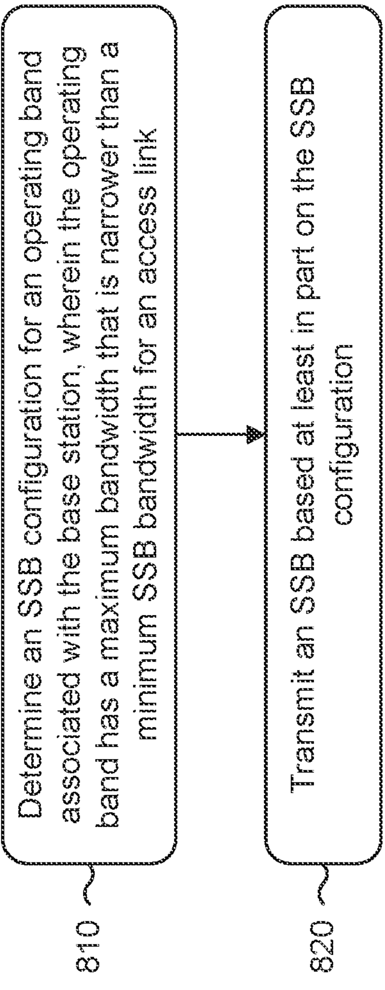

FIG. 8 is a diagram illustrating an example process 800 performed, for example, by a base station, in accordance with various aspects of the present disclosure. Example process 800 is an example where the base station (e.g., base station 110) performs operations associated with an SSB configuration for a bandwidth narrower than a minimum bandwidth.

As shown in FIG. 8, in some aspects, process 800 may include determining an SSB configuration for an operating band associated with the base station, wherein the operating band has a maximum bandwidth that is narrower than a minimum SSB bandwidth for an access link (block 810). For example, the base station (e.g., using determination component 1008, depicted in FIG. 10) may determine an SSB configuration for an operating band associated with the base station, wherein the operating band has a maximum bandwidth that is narrower than a minimum SSB bandwidth for an access link, as described above.

As further shown in FIG. 8, in some aspects, process 800 may include transmitting an SSB based at least in part on the SSB configuration (block 820). For example, the base station (e.g., using transmission component 1004, depicted in FIG. 10) may transmit an SSB based at least in part on the SSB configuration, as described above.

Process 800 may include additional aspects, such as any single aspect or any combination of aspects described below and/or in connection with one or more other processes described elsewhere herein.

In a first aspect, the SSB includes one or more punctured edges such that the SSB includes a set of RBs only in a frequency region that is within the maximum bandwidth of the operating band.

In a second aspect, alone or in combination with the first aspect, a portion of bits transmitted in a PBCH of the SSB are predefined.

In a third aspect, alone or in combination with one or more of the first and second aspects, the set of RBs in the frequency region carry an SSS and a PBCH DMRS that have an equivalent EPRE.

In a fourth aspect, alone or in combination with one or more of the first through third aspects, the SSB includes a PN sequence associated with a PBCH in the frequency region of the SSB that is within the maximum bandwidth of the operating band.

In a fifth aspect, alone or in combination with one or more of the first through fourth aspects, the SSB includes a symbol to carry one or more PBCH RBs located in the one or more punctured edges outside the frequency region of the SSB that is within the maximum bandwidth of the operating band.

In a sixth aspect, alone or in combination with one or more of the first through fifth aspects, the SSB configuration includes an RE mapping for the symbol to carry the one or more PBCH RBs.

In a seventh aspect, alone or in combination with one or more of the first through sixth aspects, the SSB includes a first set of RBs that are transmitted in a first SSB occasion only in an upper frequency region that is within the maximum bandwidth of the operating band, and a second set of RBs that are transmitted in a second SSB occasion only in a lower frequency region that is within the maximum bandwidth of the operating band.

In an eighth aspect, alone or in combination with one or more of the first through seventh aspects, the SSB configuration is based at least in part on a sidelink SSB configuration requiring a minimum bandwidth that is narrower than the maximum bandwidth of the operating band.

In a ninth aspect, alone or in combination with one or more of the first through eighth aspects, the SSB configuration includes an initial group of symbols that carry a PSS, an SSS, and a PBCH, and wherein the SSB configuration further includes a final symbol that carries a repeated PSS symbol, a repeated SSS symbol, a repeated PBCH symbol, or a downlink transmission.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
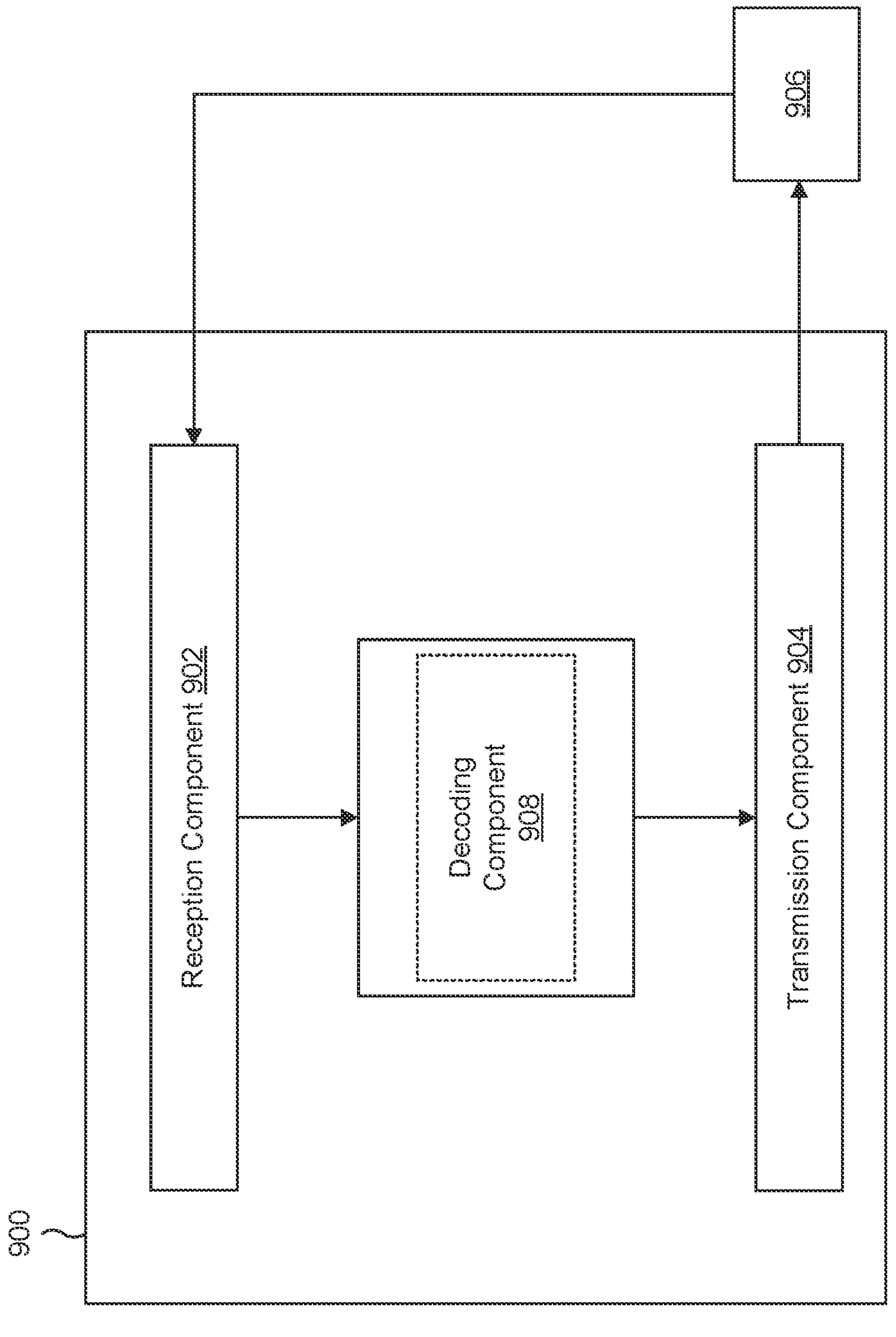
FIGS. 9-10 are block diagrams of example apparatuses for wireless communication, in accordance with the present disclosure.

FIG. 9 is a block diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a decoding component 908, among other examples.

In some aspects, the apparatus 900 may be configured to perform one or more operations described herein in connection with FIGS. 6A-6E. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be co-located with the reception component 902 in a transceiver.

The reception component 902 may receive, from a base station, an SSB associated with an SSB configuration for an operating band having a maximum bandwidth that is narrower than a minimum SSB bandwidth for an access link. The decoding component 908 may decode the SSB based at least in part on the SSB configuration.

The decoding component 908 may refrain from performing channel estimation using a PBCH DMRS in one or more punctured edges of the SSB. The decoding component 908 may decode only a set of RBs in a frequency region of the SSB that is within the maximum bandwidth of the operating band.

The decoding component 908 may determine the one or more punctured edges based at least in part on a configuration associated with the operating band or based at least in part on blind detection of a PN sequence associated with a PBCH in the frequency region of the SSB that is within the maximum bandwidth of the operating band.

The decoding component 908 may combine a first portion of a PBCH carried in an upper frequency region in a first SSB occasion with a second portion of the PBCH carried in a lower frequency region in a second SSB occasion.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
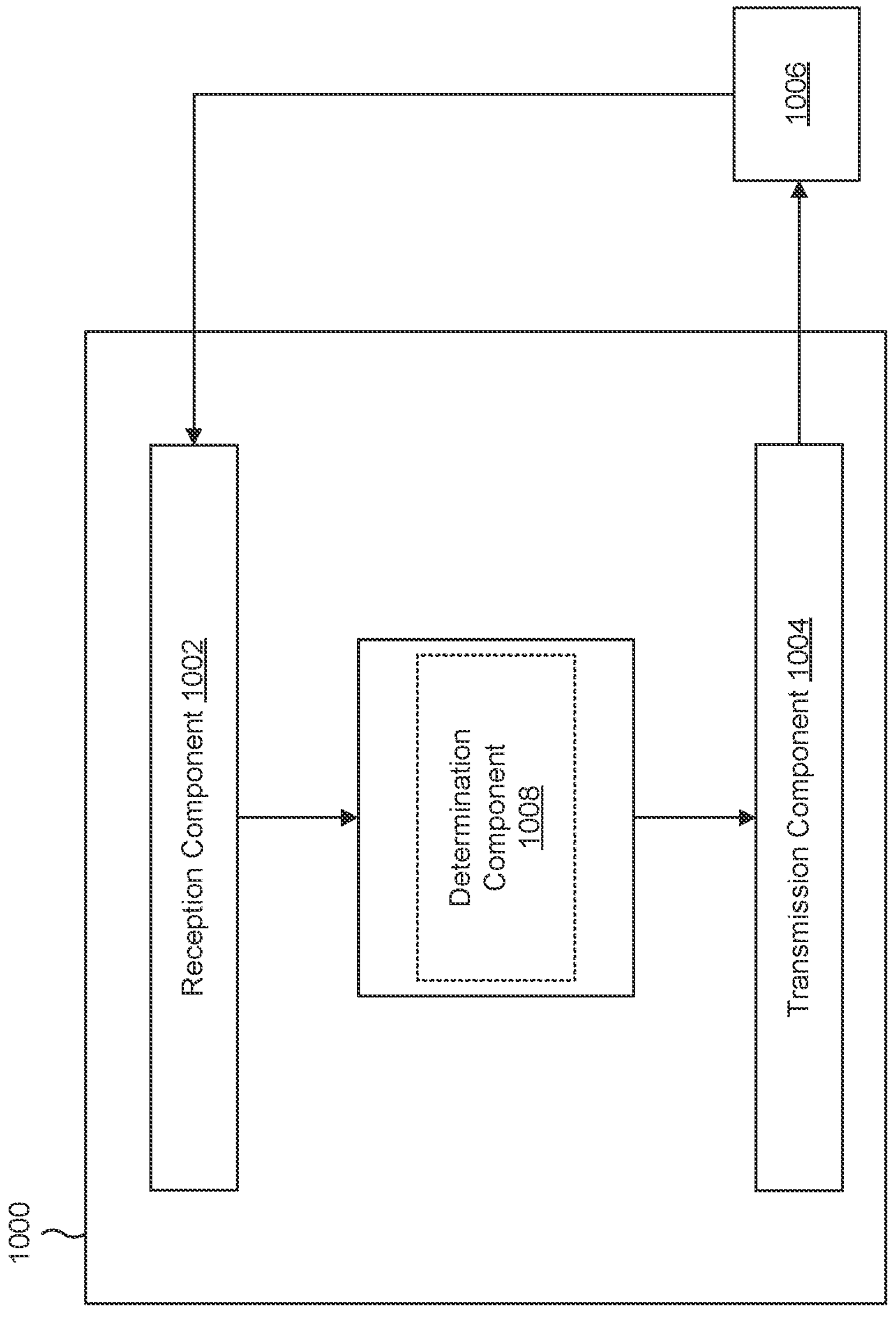

FIG. 10 is a block diagram of an example apparatus 1000 for wireless communication. The apparatus 1000 may be a base station, or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a determination component 1008, among other examples.

In some aspects, the apparatus 1000 may be configured to perform one or more operations described herein in connection with FIGS. 6A-6E. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the base station described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the base station described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the base station described above in connection with FIG. 2. In some aspects, the transmission component 1004 may be co-located with the reception component 1002 in a transceiver.

The determination component 1008 may determine an SSB configuration for an operating band associated with the base station, wherein the operating band has a maximum bandwidth that is narrower than a minimum SSB bandwidth for an access link. The transmission component 1004 may transmit an SSB based at least in part on the SSB configuration.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some aspects of the present disclosure:

Aspect 1: A method of wireless communication performed by a UE, comprising: receiving, from a base station, an SSB associated with an SSB configuration for an operating band having a maximum bandwidth that is narrower than a minimum SSB bandwidth for an access link; and decoding the SSB based at least in part on the SSB configuration.

Aspect 2: The method of aspect 1, wherein the SSB includes one or more punctured edges such that the SSB includes a set of RBs only in a frequency region that is within the maximum bandwidth of the operating band.

Aspect 3: The method of any of aspects 1-2, wherein a portion of bits transmitted in a PBCH of the SSB are predefined.

Aspect 4: The method of aspect 2, wherein the set of RBs in the frequency region carry an SSS and a PBCH DMRS that have an equivalent EPRE.

Aspect 5: The method of any of aspects 2-4, wherein decoding the SSB includes: refraining from performing channel estimation using a PBCH DMRS in the one or more punctured edges; and decoding only the set of RBs in the frequency region of the SSB that is within the maximum bandwidth of the operating band.

Aspect 6: The method of any of aspects 2-5, wherein decoding the SSB includes: determining the one or more punctured edges based at least in part on a configuration associated with the operating band or based at least in part on blind detection of a PN sequence associated with a PBCH in the frequency region of the SSB that is within the maximum bandwidth of the operating band.

Aspect 7: The method of any of aspects 2-6, wherein the SSB includes a symbol to carry one or more PBCH RBs located in the one or more punctured edges outside the frequency region of the SSB that is within the maximum bandwidth of the operating band.

Aspect 8: The method of aspect 7, wherein the SSB configuration includes an RE mapping for the symbol to carry the one or more PBCH RBs.

Aspect 9: The method of aspect 1, wherein the SSB includes a first set of RBs that are transmitted in a first SSB occasion only in an upper frequency region that is within the maximum bandwidth of the operating band, and a second set of RBs that are transmitted in a second SSB occasion only in a lower frequency region that is within the maximum bandwidth of the operating band.

Aspect 10: The method of aspect 9, wherein decoding the SSB includes: combining a first portion of a PBCH carried in the upper frequency region in the first SSB occasion with a second portion of the PBCH carried in the lower frequency region in the second SSB occasion.

Aspect 11: The method of aspect 1, wherein the SSB configuration is based at least in part on a sidelink SSB configuration requiring a minimum bandwidth that is narrower than the maximum bandwidth of the operating band.

Aspect 12: The method of aspect 11, wherein the SSB configuration includes an initial group of symbols that carry a PSS, an SSS, and a PBCH, and wherein the SSB configuration further includes a final symbol that carries a repeated PSS symbol, a repeated SSS symbol, a repeated PBCH symbol, or a downlink transmission.

Aspect 13: A method of wireless communication performed by a base station, comprising: determining an SSB configuration for an operating band associated with the base station, wherein the operating band has a maximum bandwidth that is narrower than a minimum SSB bandwidth for an access link; and transmitting an SSB based at least in part on the SSB configuration.

Aspect 14: The method of aspect 13, wherein the SSB includes one or more punctured edges such that the SSB includes a set of RBs only in a frequency region that is within the maximum bandwidth of the operating band.

Aspect 15: The method of any of aspects 13-14, wherein a portion of bits transmitted in a PBCH of the SSB are predefined.

Aspect 16: The method of any of aspects 14-15, wherein the set of RBs in the frequency region carry an SSS and a PBCH DMRS that have an equivalent EPRE.

Aspect 17: The method of any of aspects 14-16, wherein the SSB includes a PN sequence associated with a PBCH in the frequency region of the SSB that is within the maximum bandwidth of the operating band.

Aspect 18: The method of any of aspects 14-17, wherein the SSB includes a symbol to carry one or more PBCH RBs located in the one or more punctured edges outside the frequency region of the SSB that is within the maximum bandwidth of the operating band.

Aspect 19: The method of aspect 18, wherein the SSB configuration includes an RE mapping for the symbol to carry the one or more PBCH RBs.

Aspect 20: The method of aspect 13, wherein the SSB includes a first set of RBs that are transmitted in a first SSB occasion only in an upper frequency region that is within the maximum bandwidth of the operating band, and a second set of RBs that are transmitted in a second SSB occasion only in a lower frequency region that is within the maximum bandwidth of the operating band.

Aspect 21: The method of aspect 13, wherein the SSB configuration is based at least in part on a sidelink SSB configuration requiring a minimum bandwidth that is narrower than the maximum bandwidth of the operating band.

Aspect 22: The method of aspect 21, wherein the SSB configuration includes an initial group of symbols that carry a PSS, an SSS, and a PBCH, and wherein the SSB configuration further includes a final symbol that carries a repeated PSS symbol, a repeated SSS symbol, a repeated PBCH symbol, or a downlink transmission.

Aspect 23: An apparatus for wireless communication at a device, comprising a processor; memory coupled with the processor; and instructions stored in the memory and executable by the processor to cause the apparatus to perform the method of any of aspects 1-12.

Aspect 24: A device for wireless communication, comprising a memory and one or more processors coupled to the memory, the memory and the one or more processors configured to perform the method of any of aspects 1-12.

Aspect 25: An apparatus for wireless communication, comprising at least one means for performing the method of any of aspects 1-12.

Aspect 26: A non-transitory computer-readable medium storing code for wireless communication, the code comprising instructions executable by a processor to perform the method of any of aspects 1-12.

Aspect 27: A non-transitory computer-readable medium storing a set of instructions for wireless communication, the set of instructions comprising one or more instructions that, when executed by one or more processors of a device, cause the device to perform the method of any of aspects 1-12.

Aspect 28: An apparatus for wireless communication at a device, comprising a processor; memory coupled with the processor; and instructions stored in the memory and executable by the processor to cause the apparatus to perform the method of any of aspects 13-22.

Aspect 29: A device for wireless communication, comprising a memory and one or more processors coupled to the memory, the memory and the one or more processors configured to perform the method of any of aspects 13-22.

Aspect 30: An apparatus for wireless communication, comprising at least one means for performing the method of any of aspects 13-22.

Aspect 31: A non-transitory computer-readable medium storing code for wireless communication, the code comprising instructions executable by a processor to perform the method of any of aspects 13-22.

Aspect 32: A non-transitory computer-readable medium storing a set of instructions for wireless communication, the set of instructions comprising one or more instructions that, when executed by one or more processors of a device, cause the device to perform the method of any of aspects 13-22.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:

receiving, from a base station, a synchronization signal block (SSB) associated with an SSB configuration for an operating band having a maximum bandwidth that is narrower than a minimum SSB bandwidth for an access link, wherein the SSB includes one or more punctured edges such that the SSB includes a set of resource blocks (RBs) only in a frequency region that is within the maximum bandwidth of the operating band, and wherein RBs in the punctured edges are not received by the UE; and decoding the SSB based at least in part on the SSB configuration.

2. The method of claim 1, wherein a portion of bits transmitted in a physical broadcast channel of the SSB are predefined.

3. The method of claim 1, wherein the set of RBs in the frequency region carry a secondary synchronization signal and a physical broadcast channel demodulation reference signal that have an equivalent energy per resource element.

4. The method of claim 1, wherein decoding the SSB includes:

refraining from performing channel estimation using a physical broadcast channel demodulation reference signal in the one or more punctured edges; and decoding only the set of RBs in the frequency region of the SSB that is within the maximum bandwidth of the operating band.

5. The method of claim 1, wherein decoding the SSB includes:

determining the one or more punctured edges based at least in part on a configuration associated with the operating band or based at least in part on blind detection of a pseudo-noise sequence associated with a physical broadcast channel in the frequency region of the SSB that is within the maximum bandwidth of the operating band.

6. The method of claim 1, wherein the SSB includes a symbol to carry one or more physical broadcast channel (PBCH) resource blocks (RBs) located in the one or more punctured edges outside the frequency region of the SSB that is within the maximum bandwidth of the operating band.

7. The method of claim 6, wherein the SSB configuration includes a resource element mapping for the symbol to carry the one or more PBCH RBs.

8. The method of claim 1, wherein the SSB includes a first set of resource blocks (RBs) that are transmitted in a first SSB occasion only in an upper frequency region that is within the maximum bandwidth of the operating band, and a second set of RBs that are transmitted in a second SSB occasion only in a lower frequency region that is within the maximum bandwidth of the operating band.

9. The method of claim 8, wherein decoding the SSB includes:

combining a first portion of a physical broadcast channel (PBCH) carried in the upper frequency region in the first SSB occasion with a second portion of the PBCH carried in the lower frequency region in the second SSB occasion.

10. The method of claim 1, wherein the SSB configuration is based at least in part on a sidelink SSB configuration requiring a minimum bandwidth that is narrower than the maximum bandwidth of the operating band.

11. The method of claim 10, wherein the SSB configuration includes an initial group of symbols that carry a primary synchronization signal (PSS), a secondary synchronization signal (SSS), and a physical broadcast channel (PBCH), and wherein the SSB configuration further includes a final symbol that carries a repeated PSS symbol, a repeated SSS symbol, a repeated PBCH symbol, or a downlink transmission.

12. The method of claim 1, further comprising:

refraining from decoding RBs in the punctured edges.

13. A method of wireless communication performed by a base station, comprising:

determining a synchronization signal block (SSB) configuration for an operating band associated with the base station, wherein the operating band has a maximum bandwidth that is narrower than a minimum SSB bandwidth for an access link; and transmitting an SSB based at least in part on the SSB configuration, wherein the SSB includes one or more punctured edges such that the SSB includes a set of resource blocks (RBs) only in a frequency region that is within the maximum bandwidth of the operating band, and wherein RBs in the punctured edges are not transmitted by the base station.

14. The method of claim 13, wherein a portion of bits transmitted in a physical broadcast channel of the SSB are predefined.

15. The method of claim 13, wherein the set of RBs in the frequency region carry a secondary synchronization signal and a physical broadcast channel demodulation reference signal that have an equivalent energy per resource element.

16. The method of claim 13, wherein the SSB includes a pseudo-noise sequence associated with a physical broadcast channel in the frequency region of the SSB that is within the maximum bandwidth of the operating band.

17. The method of claim 13, wherein the SSB includes a symbol to carry one or more physical broadcast channel (PBCH) resource blocks (RBs) located in the one or more punctured edges outside the frequency region of the SSB that is within the maximum bandwidth of the operating band.

18. The method of claim 17, wherein the SSB configuration includes a resource element mapping for the symbol to carry the one or more PBCH RBS.

19. The method of claim 13, wherein the SSB includes a first set of resource blocks (RBs) that are transmitted in a first SSB occasion only in an upper frequency region that is within the maximum bandwidth of the operating band, and a second set of RBs that are transmitted in a second SSB occasion only in a lower frequency region that is within the maximum bandwidth of the operating band.

20. The method of claim 13, wherein the SSB configuration is based at least in part on a sidelink SSB configuration requiring a minimum bandwidth that is narrower than the maximum bandwidth of the operating band.

21. The method of claim 20, wherein the SSB configuration includes an initial group of symbols that carry a primary synchronization signal (PSS), a secondary synchronization signal (SSS), and a physical broadcast channel (PBCH), and wherein the SSB configuration further includes a final symbol that carries a repeated PSS symbol, a repeated SSS symbol, a repeated PBCH symbol, or a downlink transmission.

22. A user equipment (UE) for wireless communication, comprising:

a memory; and one or more processors operatively coupled to the memory, the memory and the one or more processors configured to:

receive, from a base station, a synchronization signal block (SSB) associated with an SSB configuration for an operating band having a maximum bandwidth that is narrower than a minimum SSB bandwidth for an access link, wherein the SSB includes one or more punctured edges such that the SSB includes a set of resource blocks (RBs) only in a frequency region that is within the maximum bandwidth of the operating band, and wherein RBs in the punctured edges are not received by the UE; and decode the SSB based at least in part on the SSB configuration.

23. The UE of claim 22, wherein the SSB includes a first set of resource blocks (RBs) that are transmitted in a first SSB occasion only in an upper frequency region that is within the maximum bandwidth of the operating band, and a second set of RBs that are transmitted in a second SSB occasion only in a lower frequency region that is within the maximum bandwidth of the operating band.

24. The UE of claim 22, wherein the SSB configuration is based at least in part on a sidelink SSB configuration requiring a minimum bandwidth that is narrower than the maximum bandwidth of the operating band.

25. The UE of claim 22, wherein the one or more processors are further configured to:

refrain from decoding RBs in the punctured edges.

26. The UE of claim 22, wherein a portion of bits transmitted in a physical broadcast channel of the SSB are predefined.

27. UE of claim 22, wherein the set of RBs in the frequency region carry a secondary synchronization signal and a physical broadcast channel demodulation reference signal that have an equivalent energy per resource element.

28. A base station for wireless communication, comprising:

a memory; and one or more processors operatively coupled to the memory, the memory and the one or more processors configured to:

determine a synchronization signal block (SSB) configuration for an operating band associated with the base station, wherein the operating band has a maximum bandwidth that is narrower than a minimum SSB bandwidth for an access link; and transmit an SSB based at least in part on the SSB configuration, wherein the SSB includes one or more punctured edges such that the SSB includes a set of resource blocks RBs) only in a frequency region that is within the maximum bandwidth of the operating band, and wherein RBs in the punctured edges are not transmitted by the base station.

29. The base station of claim 28, wherein the SSB includes a first set of resource blocks (RBs) that are transmitted in a first SSB occasion only in an upper frequency region that is within the maximum bandwidth of the operating band, and a second set of RBs that are transmitted in a second SSB occasion only in a lower frequency region that is within the maximum bandwidth of the operating band.

30. The base station of claim 28, wherein the SSB configuration is based at least in part on a sidelink SSB configuration requiring a minimum bandwidth that is narrower than the maximum bandwidth of the operating band.

* * * * *